United States Patent Office 3,681,046
Patented Aug. 1, 1972

3,681,046
METHOD OF SULPHATIZING NON-FERROUS METALS IN FINELY GROUND IRON OR OTHER ORES
Petri Baldur Bryk and Jorma Bruno Honkasalo, Helsinki, and Rolf Einar Malmstrom, Pori, Finland, assignors to Outokumpu Oy, Outokumpu, Finland
No Drawing. Continuation-in-part of application Ser. No. 605,153, Dec. 28, 1966. This application Oct. 7, 1969, Ser. No. 864,555
Int. Cl. C21b 1/02; C22b 1/10
U.S. Cl. 75—1                                                                        1 Claim

ABSTRACT OF THE DISCLOSURE

A method of sulphatizing non-ferrous metals present as impurities in iron or other ore. In a fluidized bed furnace finely ground oxidic material containing copper, cobalt, nickel, zinc, etc. is mixed with a predetermined amount of sulphidic raw material. Combustion produces a condition of heat equilibrium favorable to sulphatization and the impurities are removed as soluble sulphates.

CROSS REFERENCE TO RELATED APPLICATION

This application is a continuation-in-part of our previous application Ser. No. 605,153 filed Dec. 28, 1966, entitled "Method of Sulphatizing Non-Ferrous Metals in Finely Ground Iron or Other Ores" and now abandoned.

BACKGROUND OF THE INVENTION

Field of the invention

The invention relates to a method of sulphatizing non-ferrous metals present in small amounts in finely ground sulphide ores or concentrates in a fluidized bed furnace.

Description of the prior art

In practice, iron can be roasted for sulphatization in a fluidized bed furnace in which it is easy to control the temperature and other conditions. Up to now, only ores containing sulphides have been used for sulphatizing roasting, employing the following reactions, among others:

(1) $2FeS_2 + 5\tfrac{1}{2} O_2 \rightarrow Fe_2O_3 + 4SO_2$
(2) $2FeS + 3\tfrac{1}{2} O_2 \rightarrow Fe_2O_3 + 2SO_2$
(3) $MeS + (1 + \tfrac{1}{2}x)O_2 \rightarrow MeO_x + SO_2$
(4) $SO_2 + \tfrac{1}{2}O_2 \rightleftharpoons SO_{3(g)}$
(5) $MeO + SO_3 \rightleftharpoons MeSO_4 + heat$ The last two reactions, which are important for sulphatization, are reversible and closely dependent on the temperature and composition of the gases. It has been found that owing to the thermal dissociation of metal sulphates, the best temperature for sulphatization is roughly 700° C., at which temperature the quantity of iron sulphate remains small and more air must be used than is theoretically required for the oxidazation of the sulphides and formation of metal sulphates.

Since all the above chemical reactions are intensely exothermic and it is essential to keep the temperature constant, controlled cooling is indispensible. It is difficult to use cooling elements in the fluidized bed itself because large quantities of material containing iron sulphates tend to stick to the elements at low temperatures. In prior known methods, cooling is performed by adding water directly on to the fluidized bed, partly by feeding in the concentrate in the form of a sludge and partly by spraying in water directly. The heat economy of these methods is disadvantageous because the cooling is effected mainly by water vapourization and, in practice, it is impossible to store the heat of vapourization. Furthermore, when the concentrate is sprayed into the furnace from above in sludge form in order to produce even conditions, the exhaust gases are cooled unnecessarily, with additional detriment to the heat economy and causing intensive iron sulphatization in the flying dust.

Various modifications of the sulphatizing roasting are used distinguishing with respect to on one hand the apparatuses used in the process and on the other hand the quality of the raw material and its content of non-ferrous metal to be sulphatized.

The apparatuses of the sulphatizing roasting are generally similar to those utilized in the desulphurizing roasting and their use is also principally the same, but as to technical details they are distinguishable from each other.

The object of the sulphatization is to treat the oxidic material with oxide and sulphur dioxide containing gases to form soluble non-ferrous metal sulphates.

Generally the sulphatizing is effected so that almost all sulphidic sulphur is roasted from the ore and the product so obtained is further treated with gases from the roasting to which originally so much oxygen is added that sulphatizing conditions are established.

The German patent specification No. 347,834 is an example of this.

For different raw materials dissimilar sulphatizing conditions must be employed depending upon which metal sulphate is wished, i.e. what metal should be sulphatized and depending upon if it is the main compound in the material or only a minor part thereof, in which case the main compound is allowed to be sulphatized only a little if at all.

The German patent specification No. 976,168 discloses a process, in which the sulphatizing roasting of the sulphidic copper ore and concentrate is effected in a fluidized bed furnace. In this case it is explicitly wished to control the relative quantities of the water soluble copper sulphate and the CuO of the acid solution by adjusting the excess of oxygen in the sulphatizing gases in a suitable manner simultaneously using a temperature, 700° C. to 750° C., high enough to prevent the formation of iron sulphate.

A similar process is disclosed in the U.S. patent specification No. 2,783,141, wherein an application of the fluidized bed process and the selective roasting of an iron containing sulphidic ore are given, so that the copper is obtained soluble the iron remaining almost insoluble. Unique in this process is the way in which the acid and water soluble quantity of the copper is varied, this is effected by adjusting the quantities of oxygen to a multiple in excess of the theoretical oxygen (up to 400%) with a simultaneous temperature variation (from 550° C. to 750° C.).

U.S. patent specification No. 2,026,775 discloses sulphatizing treatment of a sulphide ore containing non-ferrous metals in a rotary-tube furnace counter-currently the roasting air being introduced into the furnace at the charging end of the ore and the sulphatizing air at the discharging end thereof. This process suffers from the disadvantage that despite the sufficient $SO_2$ content of the gases from the preliminary roasting a new atmosphere must be created by a separate measure (a sulphide dust is blown into the furnace with the air at a suitable point), although the sulphatization and roasting are carried out in one apparatus at the same time.

In the article "The Fluidized Bed Reactor Installation at Sparrows Point," by H. B. Scharf and E. C. Dominiquez, Mining Engineering May 1956, page 523, the treatment of cobalt containing pyrite (cobalt sulfate roasting) is taught and therein is mentioned that cobalt containing pyrite was roasted on trial to achieve an advantageous $SO_2$ content of the gases for the preparation of sulphuric acid. The roasted product obtained was then subjected to chlorinating roasting to make the cobalt soluble.

However, generally the cobalt containing pyrite is subjected to sulphatizing roasting in one stage in a fluidized bed furnace and the gases so obtained are then used in the ordinary manner for the production of sulphuric acid.

In the method according to the invention these disadvantages are eliminated. The method is intended for the treatment of such finely divided ores as are usually suitable for fluidized bed furnaces as to their grain size.

SUMMARY OF THE INVENTION

The purpose of the process is to convert non-ferrous metals, such as copper, cobalt, nickel, zinc, etc., which are detrimental to the smelting of iron but often valuable in themselves, into soluble sulphates, so that the iron remains almost entirely in the form of $Fe_2O_3$. The process can be used for other ores besides iron ores.

According to the invention unroasted sulphide ore is added in a quantity of from 0.05 to 1 time the quantity of oxidic material to the roasted oxidic raw material from the sulphide ore to achieve equilibrium and favorable sulphatizing conditions.

DESCRIPTION OF THE PREFERRED EMBODIMENTS

The method is based on the principle that the sulphur can be removed from an essential part of the sulpidic ore by a separate roasting and obtain an oxidic raw material, the metals of which are sulphatized with only the quantity of sulphide ores that is necessary to achieve heat equilibrium and favorable sulphatization conditions. The minimum quantity of sulphide ores to be fed is determined according to the temperature to be achieved and maintained. On the other hand, there must be enough sulphide ores to produce in the furnace a gas mixture containing sufficient $SO_3$ for the formation of metal sulphates. Air is used as the fluidizing gas, burning its oxygen only partly to achieve a sufficient heat evolution in the bed. For the sulphatization a suitable atmosphere is created having a sufficient quantity of oxygen, $SO_2$ and SO. The sulphide ores are used in a quantity of 0.05 to 1 times the oxidic feed. The ores can be fed either dry or in their natural state of humidity.

On studying the speed of the reactions employed for the sulphatizing roasting in the fluidized bed, it is found that Reactions 1, 2 and 3 occur so rapidly that several feed points for sulphide ores are required to assure a sufficiently consistent $SO_2$ atmosphere in the furnace—their number depending on the size of the furnace. Generally speaking, only one feed point is needed for oxide ore. Since the conditions required for sulphatization—the composition of the gases—can usually be achieved within wide limits as regards the ratio of sulphide concentrate to oxide ores, the maintenance of heat equilibrium becomes the limiting factor. The particle size of the feed material will govern the ratio of oxides to sulphides to be used, and, of course, the particle size must remain the same throughout the process to maintain optimum conditions. The feed ratio should be selected so that the final fine adjustment of the temperature can be achieved by small spray of water direct on to the fluidized bed. This causes no substantial cooling of the exhaust gases.

This method provides a capacity per furnace unit many times greater than that of prior known methods in which the only starting materials are sulphide ores. As it can also be used advantageously to sulphatize oxide ores, the bulk of the sulphide ores can first be roasted to form oxide ores in the normal way. This assures a supply of considerably better $SO_2$ gases than the prior known method in which the sulphide ores are sulphatized direct. It also produces an advantageous economy.

Examples of sulphatization in a 5 sq. m.-fluidized bed furnace:

All the analyses concerning solids are given in terms of percentages by weight and all the analyses concerning gases are given in terms of percentages by volume.

Sulphur concentrate analysis:

| | |
|---|---:|
| Fe | 47.14 |
| S | 42.14 |
| Cu | 0.22 |
| Co | 0.55 |
| Ni | 0.22 |
| Zn | 1.47 |
| Others | 8.25 |

Analysis of product of the above concentrate roasted in fluidized bed furnace:

| | |
|---|---:|
| Fe | 59.70 |
| Sulphide S | 2.60 |
| Cu | 0.28 |
| Co | 0.71 |
| Ni | 0.28 |
| Zn | 1.86 |

At a sulphatization temperature of 670° C. the speed of the gas flow per free cross section of the furnace is 0.25 m./sec.

The residence time of the material to be sulphated in the reactor can be seen from the following table to depend on the ratio of sulphidic ore to oxidic ore in the feed. A greater proportion of sulphides requires a longer time of residence because, obviously, the removed amount must balance the amount fed in or the quantity of material in the fluidized bed will increase and "suffocate" the furnace, changing the sulphating conditions and causing the temperature to begin to decrease.

SC=sulphide concentrate
RP=product roasted from pyrites concentrate

| SC:RP (by weight): | Total qty. fed in per hour, kg. |
|---|---:|
| 1/0 | 390 |
| 1/1 | 725 |
| 1/2 | 1000 |
| 1/3 | 1265 |
| 1/4 | 1475 |
| 1/5 | 1665 |
| 1/6 | 1840 |

Thus an infeed ratio of 1:6 gave almost the capacity of pure sulphide concentrate infeed.

Using an SC:RP ratio of 1:3 and 1.6 times the theoretical air requirement, the following product analysis was obtained: total solubility 10.4–11.4%, soluble Fe 0.19–0.23%, the residue insoluble in water contained the following metals:

| | Percent |
|---|---:|
| Co | 0.10 |
| Ni | 0.11–0.12 |
| Cu | 0.03 |
| Zn | 0.08–0.10 |
| Sulphide S | 0.2 |

Using an SC:RP ratio of 1:5 and 1.6 times the theoretical air requirement, the following product analysis was obtained: total solubility 11-12%, soluble Fe 0.2-0.3%, undissolved:

| | Percent |
|---|---|
| Co | 0.10-0.11 |
| Ni | 0.11-0.12 |
| Cu | 0.02-0.03 |
| Zn | 0.12-0.13 |
| Sulphide S | 0.2 |

From the product analyses above only the components and their changes relevant from the point of view of sulphating are indicated. At the beginning of the example the total analyses of both the sulphidic and oxidic starting materials are set forth.

The temperature of the fluidized bed was 670-675° C., and the humidity of the concentrate fed in was 6-7%.

The $SO_2+SO_3$ content in the rest of the gases amounted to c. 7-9% and the oxygen content c. 8% of the dry gas.

We claim:

1. A method of sulphatizing non-ferrous metals present in small amounts in finely ground iron ores and other sulphide ores and concentrates in a fluidized bed furnace to create favourable sulphatizing conditions, comprising: feeding sulphidic raw material into the furnace at a plurality of points together with an oxidic raw material roasted from sulphide ore so that in a ratio based on weights the quantity of sulphide raw material is from 0.05 to 1 times the quantity of oxidic raw material; and simultaneously spraying a small quantity of water directly into the bed for fine adjustment of the temperature thereof to maintain conditions favourable to sulphatizing by maintaining the temperature of the fluidized bed in a range of from about 670° to about 675° C.

References Cited

UNITED STATES PATENTS

| | | | |
|---|---|---|---|
| 1,043,291 | 11/1912 | Borchers | 75—21 |
| 2,025,068 | 12/1935 | Mitchell | 75—7 |
| 2,683,077 | 7/1954 | Lewis | 75—26 |
| 1,486,256 | 3/1924 | Merryweather | 75—116 |
| 2,026,775 | 1/1936 | Debuch | 75—116 |
| 2,197,185 | 4/1940 | Kissock | 75—116 |
| 2,719,082 | 9/1955 | Sproule | 75—116 |
| 2,783,141 | 2/1957 | Foley | 75—26 |
| 2,796,340 | 6/1957 | Cyr | 75—9 |

WINSTON A. DOUGLAS, Primary Examiner

P. D. ROSENBERG, Assistant Examiner

U.S. Cl. X.R.

75—9, 26, 34, 115